(12) United States Patent
Johnson et al.

(10) Patent No.: US 10,371,579 B1
(45) Date of Patent: Aug. 6, 2019

(54) BLACK SILICON BLACKBODY CALIBRATION TARGET

(71) Applicant: The United States of America as Represented by the Administrator of NASA, Washington, DC (US)

(72) Inventors: William R. Johnson, Brea, CA (US); Karl Y. Yee, Pasadena, CA (US); Simon J. Hook, Pasadena, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 260 days.

(21) Appl. No.: 15/386,821

(22) Filed: Dec. 21, 2016

(51) Int. Cl.
    *G01K 15/00* (2006.01)
    *G01J 5/52* (2006.01)

(52) U.S. Cl.
    CPC ................... *G01J 5/522* (2013.01)

(58) Field of Classification Search
    USPC ...................................................... 374/1, 141
    See application file for complete search history.

(56) References Cited

U.S. PATENT DOCUMENTS

| | | | |
|---|---|---|---|
| 5,668,072 A | 9/1997 | Holcombe, Jr. et al. | |
| 5,714,759 A | 2/1998 | Nelson | |
| 6,007,873 A | 12/1999 | Holcombe, Jr. et al. | |
| 7,057,256 B2 | 6/2006 | Carey, III et al. | |
| 7,105,047 B2 | 9/2006 | Simmons et al. | |
| 7,390,689 B2 | 6/2008 | Mazur et al. | |
| 7,504,702 B2 | 3/2009 | Mazur et al. | |
| 7,781,856 B2 | 8/2010 | Mazur et al. | |
| 8,080,467 B2 | 12/2011 | Carey, III et al. | |
| 8,657,487 B2 | 2/2014 | Bingham et al. | |
| 9,212,968 B1 | 12/2015 | Smith et al. | |
| 9,276,143 B2 | 3/2016 | Mazur et al. | |
| 2008/0258604 A1 | 10/2008 | Mazur et al. | |

FOREIGN PATENT DOCUMENTS

EP 0301290 12/1991

OTHER PUBLICATIONS

Wu et al, "Back silicon a new light absorber," APS Centennial Meeting, Mar. 23, 1999.
"Field Emission from Silicon Microstructures Formed by Femtosecond Laser Assisted Etching" JECarey, LZhao, CWu, EMazur and CHCrouch CLEO 2001(Baltimore, MD, 2001)555-556.
Near-unity below-band gap absorption by microstructured silicon CWu CHCrouch LZhao JECarey RJYounkin JALevineon EMazur RMFarrel PGothoskar AKarger ApplPhysLett 78 1850-52 2001.
Mid-infrated absorptance of silicon hyperdoped with chalcogen via fs-laser irradiation M.Yu T.Lin M.T.Winkler E.Mazur C.Pruner A.Asenbaum J.App Phy113-063520-2013.

(Continued)

*Primary Examiner* — Mirellys Jagan

(57) ABSTRACT

The disclosure is directed to a blackbody calibration target having a textured silicon substrate comprising a base comprising a plurality of needle like structures extending away from the base and having a total emissivity of greater than 99.5% from an electromagnetic radiation source having a wavelength greater than or equal to about 400 nanometers and less than or equal to about 1 mm. The disclosure is further directed to a blackbody calibration target system, and instrument which includes the blackbody calibration target, and a method of calibrating an instrument.

17 Claims, 6 Drawing Sheets

SEM of cross sectional side view of sample 1. Average needle height from base ~5-6μm. Average needle width (diameter) ~0.5-1μm.

(56) References Cited

OTHER PUBLICATIONS

Emissivity of microstructured silicon P.Maloney P.Smith V.King C.Billman M.Winkier E.Mazur App. Optics vol. 49, No. 7 Mar. 1, 2010.
Status of HyTES/PHyTIR Concepts and Technologies being Validated for the HyspIEI TIR Instrument Concept 2011 HyspIRI Science Workshop, WD.C. S. Hook.
http://microdevices.jpl.nasa.gov/about-mdl/annual-reports/MDL%20AR15_design_pages-web.pdf, published Jul. 2016.

SEM of cross sectional side view of sample 1. Average needle height from base ~5-6μm.
Average needle width (diameter) ~0.5-1μm, .

Overhead view at 15° from normal of sample 1. Average spacing between needles is ~0.5-2μm.

BLACK SILICON BLACKBODY CALIBRATION TARGET

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND

The present invention relates generally to black body calibration targets. In particular, black body calibration targets comprising black silicon.

Instruments require calibration. Optical instruments are typically calibrated using a calibration target. To calibrate optical thermal imaging systems accurately, a blackbody calibration source may be employed by placing a blackbody calibration target at one or more known temperatures within the optical path of the instrument, measuring the temperature of the calibration target at the various temperatures, and calibrating the instrument according to these measurements. Accurate calibration requires accurate determination of temperatures within a number of micro-Kelvin or below. However, most materials exhibit some emissivity, which is the measure of an object's ability to emit infrared and other wavelengths of energy. Emitted energy relates to the temperature of the object using the Planck law. Emissivity can have a value from 0 (e.g., a shiny mirror) to a theoretical value of 1.0, in which no extraneous electromagnetic radiation is reflected, which is a perfect blackbody.

Blackbodies known in the art utilize a temperature controlled substrate which is coated with a relatively high emissivity paint or other coating having an emissivity typically on the order of 0.9. Known blackbodies are often shaped to further limit the emissivity of the calibration target, resulting in a blackbody calibration source having an average emissivity on the order of 0.92-0.93 over a particular wavelength range. Blackbody calibration sources known in the art, however, are prone to mechanical fatigue, i.e., the coating flakes off of the substrate, the substrate becomes contaminated with materials, and the like. In addition, commercially available blackbody systems typically include a three dimensional well of substantial size and mass oriented to prevent reflection of incoming electromagnetic radiation. Such known blackbodies are often large, bulky assemblies with complicated optics and geometries. Employment of blackbodies in situations where space and mass are limited, such in spacecraft and miniaturized instruments is problematic in the art.

Blackbodies are essential to numerous facets of future space missions. The accurate calibration enables lower level raw data products from spacecraft sensors to be transitioned into meaningful, higher level products and information. Accurate blackbodies form the basis for relating raw data acquired by the instruments back to a standard metric. Likewise, as spacecraft and instruments continue to decrease in size, smaller and smaller blackbody calibrations sources are required. In addition, mass is always a primary concern in spacecraft.

There is a long felt need in the art for robust blackbody calibration targets with decreased size and mass, with improved emissivity over coated substrates.

SUMMARY

In an embodiment, a blackbody calibration target comprises a textured silicon substrate comprising a base comprising a plurality of needle like structures extending away from the base and having a total emissivity of greater than 99.5% from an electromagnetic radiation source having a wavelength greater than or equal to about 400 nanometers and less than or equal to about 1 mm.

In an embodiment, a blackbody calibration system comprises a blackbody calibration target in thermal communication with a controlled temperature source, the blackbody calibration target comprising a textured silicon substrate comprising a base comprising a plurality of needle like structures extending away from the base and having a total emissivity of greater than 99.5% from an electromagnetic radiation source having a wavelength greater than or equal to about 400 nanometers and less than or equal to about 1 mm.

In embodiments, a blackbody calibration system comprises a calibration target in thermal communication with a controlled temperature source, the blackbody calibration target comprising a textured silicon substrate comprising a base comprising a plurality of needle like structures extending away from the base and having a total emissivity of greater than 99.5% from an electromagnetic radiation source having a wavelength greater than or equal to 400 nanometers and less than or equal to about 1 mm.

In an embodiment, a method of calibrating an instrument comprises the steps of providing a blackbody calibration system comprising a calibration target in thermal communication with a temperature source, the calibration target comprising a textured silicon substrate comprising a base comprising a plurality of needle like structures extending away from the base and having a total emissivity of greater than 99.5% from an electromagnetic radiation source having a wavelength greater than or equal to about 400 nanometers and less than or equal to about 1 mm; controlling the temperature of the calibration target at a first temperature; and optically measuring the temperature of the calibration target with the instrument to calibrate the instrument.

In an embodiment, an instrument comprises an electromagnetic radiation source in optical communication with a detector along an optical path; and a blackbody calibration system arrangable within the optical path, wherein the blackbody calibration system comprises a blackbody calibration target in thermal communication with a controlled temperature source, the blackbody calibration target comprising a textured silicon substrate comprising a base comprising a plurality of needle like structures extending away from the base and having a total emissivity of greater than 99.5% at a wavelength greater than or equal to about 400 nanometers and less than or equal to about 1 mm.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
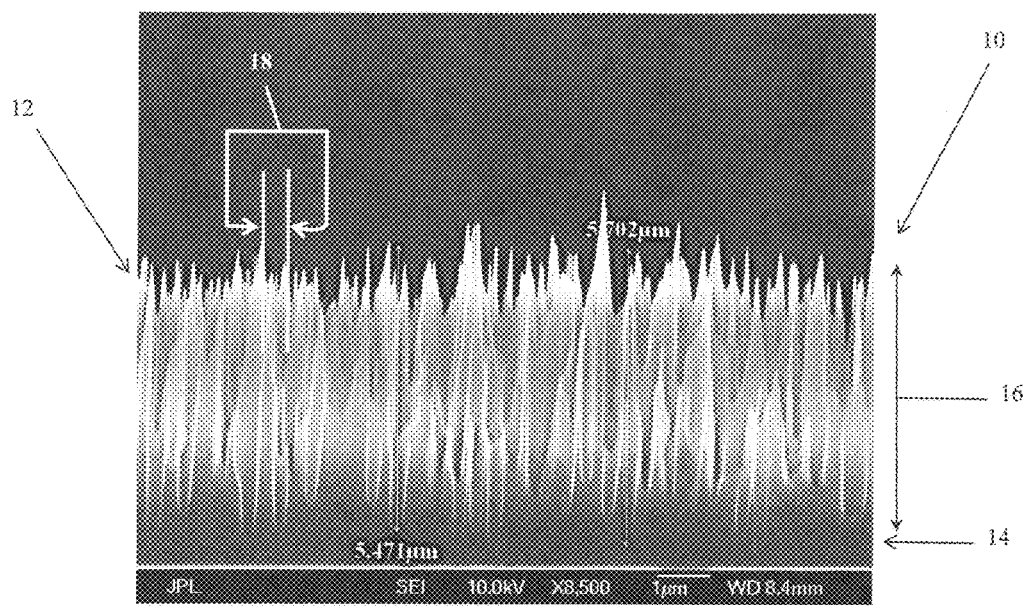
FIG. 1 is an electron micrograph showing a side view of a textured substrate according to embodiments of the instant disclosure.

The following detailed description is of the best currently contemplated modes of carrying out the invention. The description is not to be taken in a limiting sense, but is made merely for the purpose of illustrating the general principles of the invention, since the scope of the invention is best defined by the appended claims.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details unnecessary to obtain a complete understanding of the present invention have been omitted in as much as such details are within the skills of persons of ordinary skill in the relevant art.

As used in the specification and claims, "near" is inclusive of "at." The term "and/or" refers to both the inclusive "and" case and the exclusive "or" case, whereas the term "and (or)" refers to the inclusive "and" case only and such terms are used herein for brevity. For example, a component comprising "A and/or B" may comprise A alone, B alone, or both A and B; and a component comprising "A and (or) B" may comprise A alone, or both A and B.

For purposes herein, unless otherwise indicated, the emissivity of the textured substrate refers to the total emissivity, which is determined by measuring the total hemispherical reflectance using an integrating sphere source and diffuse gold standard reference.

For purposes herein, the needle like structures extending from the base are formed from the base and thus are inherently attached to the base. The needle like structures are generally frustoconical in shape, having a wider portion at the end proximate to the base and extend essentially perpendicular from the silicon substrate base to the narrower top end of the structure.

For purposes herein, the height of the needle like structures is determined from the average point on the base at which the needle like structures form to the average height of the needle like structures determined perpendicular to the plane of the base. For purposes herein, the average width of the needle like structures is determined at the average midpoint height of the structures for the particular specimen, and is expressed as an average width determined parallel to the plane of the base. For purposes herein, the height and width are determined via measuring electron micrographs of the textured substrates, unless otherwise specified.

For purposes herein, the density of needle like structures on the base is determined by examining an electron micrograph of the sample, and counting the number of needle like structures having the requisite height and width within a particular area and then calculating the density in terms of the number of structures per unit area. In the alternative, the density may be calculated based on the average area occupied by the needle like structures at the base of the substrate and the average area in between these structures.

For purposes herein, a silicon substrate refers to what is commonly referred to as a silicon wafer. The silicon substrate is typically flat on one side and textured according to embodiments disclosed herein on an opposite side. The silicon substrate need only comprise silicon, and may include any number of dopants, and/or may comprise one or more layers as indicated herein. The silicon substrate may be formed via the Czochralski process, the float zone process, the horizontal gradient freeze method, the horizontal Bridgeman method, the vertical Bridgeman method, and/or any method known in the art.

For purposes herein, an optical instrument refers to any instrument which measures properties of a sample via irradiating the sample with electromagnetic energy and detecting the resultant electromagnetic radiation. It is to be understood that an optical instrument is not limited to those which utilize electromagnetic radiation observable to the human eye, but may also include instruments which utilize electromagnetic radiation from gamma rays (e.g., wavelength ~1 picometer), to radio waves (e.g., wavelength ~100 mega meters, ELF) to measure the intended properties. Accordingly, for purposes herein, optical communication between two objects, e.g., a blackbody and an electromagnetic radiation source refers to the blackbody being in the path of the electromagnetic radiation between the source and the detector, also referred to herein as the optical path of the instrument or system. The optical path is then utilized for conducting measurements and/or calibrating the instrument.

For purposes herein, and the claims attached hereto, the new numbering scheme for the Periodic Table Groups is used as in Chem. Eng. News, 1985, 63, 27. Therefore, a "Group 4 metal" is an element from Group 4 of the Periodic Table.

In keeping with long-standing patent law convention, the words "a" and "an" when used in the present specification in concert with the word comprising, including the claims, denote "one or more." It is to be understood that for purposes herein, description in which the term "comprising" is used, unless otherwise indicated, also includes more limiting embodiments such as "consisting essentially of" and "consisting of". The term comprising is used herein for brevity.

Broadly, in embodiments, a blackbody calibration target comprises a textured silicon substrate, black silicon, comprising a base comprising a plurality of needle like structures extending away from the base. The blackbody is textured to have a total emissivity of greater than 99.5% from an electromagnetic radiation source having a wavelength greater than or equal to about 400 nanometers and less than or equal to about 1 meter, or less than or equal to about 1 mm.

In embodiments, the blackbody calibration target has a total emissivity of greater than 99.5% from an electromagnetic radiation source having a wavelength of greater than or equal to about 700 nm and less than or equal to about 1 millimeter.

In embodiments, the substrate is textured such that the plurality of needle like structures extend away from the base to an average height from the base of greater than or equal to about 1 micrometer, which are determined perpendicular to the base. In embodiments, the needle like structures have an average width of less than or equal to about 1 micrometer determined at an average midpoint height of the structures parallel to the base. In embodiments, the needle like structures have an average height from the base of less than or equal to about 50 micrometers. In embodiments, the needle like structures are present on at least a portion of the base at a density of greater than or equal to about 400,000 needle like structures per square millimeter.

In embodiments, the silicon substrate comprises monocrystalline silicon, polycrystalline silicon, amorphous silicon, or a combination thereof. In embodiments, the silicon substrate, has a resistivity of less than or equal to about 1 ohm-cm. In embodiments, the silicon substrate comprises at least one additional element, i.e., a dopant. In embodiments, the dopant is selected from Groups 13 to 16 of the periodic table, and is (are) present in an amount sufficient to produce a resistivity in the silicon substrate of less than or equal to about 1 ohm-cm.

In embodiments, the silicon substrate is textured via low temperature inductively coupled plasma etching without a mask, in the presence of oxygen. In embodiments, the plurality of needle like structures extending away from the base are produced by contacting a surface of the silicon substrate with an inductively coupled plasma comprising $SF_6$ and $O_2$ gas, without a mask, at a forward power, a temperature, a pressure and for a period of time sufficient to etch the surface to produce the plurality of needle like structures extending away from the base. In embodiments, the temperature, is less than or equal to about $-120°$ C. (i.e., $153°$ K).

In embodiments, the blackbody calibration target comprising a plurality of the textured substrates, which are fitted together to form a single calibration target. In embodiments, the plurality of the textured substrates includes a first textured substrate portion which is textured and/or produced from a substrate to have different emissivity properties than those of a second textured substrate portion present in the blackbody.

In embodiments, a blackbody calibration system comprises a blackbody calibration target according to one or more embodiments disclosed herein, in thermal communication with a controlled temperature source.

In embodiments, a method of calibrating an optical instrument comprises the step of providing a blackbody calibration system according to one or more embodiments disclosed herein, controlling the temperature of the calibration target at a first temperature; and optically measuring the temperature of the calibration target with the instrument to calibrate the instrument.

In embodiments, an optical instrument comprises an electromagnetic radiation source in optical communication with a detector along an optical path; and a blackbody calibration system according to any one or more embodiments disclosed herein which is arrangable within the optical path of the instrument.

In embodiments, the textured substrate of the blackbody calibration target has a total emissivity of greater than 99% from an electromagnetic radiation source over a portion of the electromagnetic spectrum. In embodiments, the total emissivity is greater than 99.2%, or 99.4%, or 99.5%, or 99.7%, or 99.8%, or 99.9%, or 99.95% from an electromagnetic radiation source over a portion of the electromagnetic spectrum.

In embodiments, the blackbody calibration target has a total emissivity of greater than 99%, or 99.2%, or 99.4%, or 99.5%, or 99.7%, or 99.8%, or 99.9%, or 99.95% from an electromagnetic radiation source over a wavelength of greater than or equal to about 1 nm, or 10 nm, or 100 nm, or 400 nm, or 700 nm, and less than or equal to about 100 meters, or 10 meters, or 1 meter, or 10 centimeters, or 1 centimeter, or 1 millimeter.

In embodiments, the blackbody calibration target has a total emissivity of greater than 99%, or 99.2%, or 99.4%, or 99.5%, or 99.7%, or 99.8%, or 99.9%, or 99.95% from an electromagnetic radiation source over a wavelength of greater than or equal to about 400 nm, or 700 nm, and less than or equal to about 20 micrometers, or 50 micrometers, or 1 millimeter, or 1 centimeter, or 1 meter.

In embodiments, the textured surface of the blackbody calibration target comprises a plurality of needle like structures extend away from the base to an average height from the base of greater than or equal to about 1 micrometer, or 3 micrometers, or 5 micrometers, or 7 micrometers, determined perpendicular to the base. In embodiments, the plurality of needle like structures extend away from the base to an average height from the base of less than or equal to about 100 micrometers, or 50 micrometers, or 20 micrometers, or 10 micrometers, determined perpendicular to the base. In embodiments, the needle like structures have an average width of less than or equal to about 10 micrometers, or 5 micrometers, or 2 micrometers, or 1 micrometer, or 0.8 micrometers, or 0.5 micrometers, when determined at an average midpoint height of the structures parallel to the base.

In embodiments, the blackbody calibration target comprises a plurality of the needle like structures, which are present on at least a portion of the substrate base at a density of greater than or equal to about 10,000 to 10,000,000, or greater than or equal to about 50,000, or 100,000, or 1,000,000, or 5,000,000 needle like structures per square millimeter of the substrate.

In embodiments, the silicon substrate comprises or consists essentially of monocrystalline silicon. In alternative embodiments, the silicon substrate comprises or consists essentially of polycrystalline silicon. In embodiments, the silicon substrate comprises or consists essentially of amorphous silicon.

In embodiments, the silicon substrate further comprises at least one additional element selected from Groups 1 to 17 of the periodic table of elements. In embodiments, the silicon substrate further comprises arsenic, boron, phosphorus, antimony, indium, gallium, germanium, aluminum, oxygen, chromium, vanadium, titanium, iron, or a combination thereof. In embodiments, the silicon substrate further comprises at least one additional element selected from Groups 13 to 16 of the periodic table. In embodiments, the silicon substrate further comprises arsenic, boron, phosphorus, antimony, indium, gallium, germanium, or a combination thereof. In embodiments, the at least one additional element is present in the silicon substrate in an amount sufficient to produce a resistivity of less than or equal to about 1 ohm-cm, or 0.1 ohm-cm, or 0.01 ohm-cm, or 0.001 ohm-cm, or 0.0005 ohm-cm, or 0.0001 ohm-cm.

In embodiments, the silicon substrate further comprises at least one additional element, which is present in the silicon substrate at a concentration of less than or equal to about 1.0e15 atom per cubic centimeter (a/cm$^3$), or 1.0e16 a/cm$^3$, or 1.0e17 a/cm$^3$, or 1.0e19 a/cm$^3$, or 1.0e20 a/cm$^3$, or 1.0e21 a/cm$^3$.

In embodiments, the blackbody calibration target has a total thickness of greater than or equal to about 50 micrometers, or 100 micrometers, or 200 micrometers, or 300 micrometers, or 400 micrometers. In embodiments, the blackbody calibration target has a total thickness of less than or equal to about 800 micrometers, or 900 micrometers, or 1000 micrometers.

In an embodiment, the silicon substrate is textured to form the blackbody calibration target via cryogenic etching using inductively coupled plasma (ICP). This approach results in textured silicon substrates, i.e., black silicon, according to the instant disclosure which has an emissivity near theoretical unity. The use of cryogenic ICP further results in a method to rapidly and repeatedly produce the textured silicon substrate (e.g., black silicon), over a relatively large area and in a cost effective manner.

The needle-like structures are preferably formed directly from the silicon substrate, protruding directly from the base. As such, the needle-like structures are not mechanically "attached" to the base, but instead are directly formed from the base, which results in a robust textured surface. This important distinction prevents the needle-like structures from becoming separated from the base (losing their attachment) under conditions which would otherwise cause appendages from becoming dislodged (unattached) from substrates known in the art. For example, carbon nanotubes, nanowires, and the like, often lose attachment to a surface due to physical abrasion or vibration. Coatings used in commercially available blackbodies flake off of the substrate due to repeated heating and cooling cycles. Such surfaces also become unstable when they become "wet" (contacted with water or other liquids.) However, the textured substrate according to the instant disclosure is stable in liquid environments. The needle-like structures do not lose attachment to the base nor collapse when contacted with either an aqueous or a non-aqueous liquid.

Accordingly, unlike coated surfaces and the like, the blackbody calibration target according to embodiments herein may be "cleaned" by contacting the blackbody with various solvents or solutions under a variety of conditions to remove contaminants. In addition, the thermal stability of the instant blackbody calibration target allows for contacting the target with oxygen plasma, e.g., via ICP, to clean the target. This is especially important in long duration spaceflight or other such applications.

In embodiments, the textured silicon substrate may be formed from, and thus may comprise a single layer comprising silicon. In embodiments, the textured silicon substrate may be formed from, and thus may comprise a plurality of layers, having different compositions. For example, a first base layer may comprise a first resistivity and the second layer may comprise a second resistivity which is less than or which is greater than the resistivity of the first layer.

In embodiments, the blackbody calibration target comprises a single textured substrate according to one or more embodiments disclosed herein. In embodiments, the blackbody calibration target comprises a plurality of separate textured substrates according to one or more embodiments disclosed herein, which are fitted together to form the blackbody calibration target. In embodiments, each of the plurality of separate textured substrates according to one or more embodiments disclosed herein have identical, or essentially identical emissivity properties. In alternative embodiments, a first textured substrate of the plurality of textured substrates which form the blackbody calibration target comprises a first emissivity property and a second textured substrate of the plurality of textured substrates which form the blackbody calibration target comprise a second emissivity property which is different from the first. For example, the first emissivity property may be optimized for calibration within a particular wavelength range and the second emissivity property may be optimized for calibration within a second, different wavelength range.

Formation of Textured Substrate

The textured substrate disclosed herein may be produced using a method comprising the step of inductively coupled plasma (ICP) etching at cryogenic temperatures without using a mask. In an embodiment, the textured substrate is produced by ICP cryogenically etching a base substrate comprising silicon at a temperature of less than or equal to about −120° C., by contacting the surface with an inductively coupled plasma comprising $SF_6$ and $O_2$ gas, without a mask, at a pressure and for a period of time sufficient to produce a plurality of needle like structures depending perpendicularly away from the base.

In embodiments, the plurality of needle like structures extending away from the base are produced by contacting a surface of an as yet, untextured silicon substrate, e.g., a silicon wafer, with an inductively coupled plasma comprising $SF_6$ and $O_2$ gas, without a mask, at a forward power, a temperature, a pressure and for a period of time sufficient to produce a mask in-situ, and then continue to etch the surface to produce the plurality of needle like structures extending away from the base.

In embodiments, the temperature is less than or equal to about −120° C., or −130° C., or −135° C., or −140° C., or −150° C. In embodiments, the Rf power utilized is greater than or equal to about 500 W, or 700 W, or 900 W, or 1100 W. In embodiments, the forward power is greater than or equal to about 2 W, or 4 W, or 5 W, or 7 W.

In embodiments, the pressure is less than or equal to about 50 mTorr, or 20 mTorr, or 10 mTorr, or 8 mTorr. In embodiments, the relative flows (sccm) of $SF_6$ to $O_2$ is from about 10:1 to about 1:1 $SF_6$ sccm:$O_2$ sccm. In embodiments, the etch time is greater than or equal to about 5 min., or 30 min., or 1 hour, and less than or equal to about 30 min, or 1 hour, or 10 hours.

The textured substrates utilized herein are in contrast to the black silicon produced by the so-called Bosch process, wherein a base is etched using ICP, followed by application of a passivation layer (e.g., a Teflon coating), which is once again followed by an ICP etch. These two steps are conducted over and over again until the desired texturing is achieved.

The textured substrates utilized herein are also in contrast to the black silicon produced by the processes disclosed by Mazur et al., cf. U.S. Pat. Nos. 7,390,689, 9,276,143, 8,080,467, 7,781,856, 7,504,702, 7,057,256, US 2008/0258604, and the like. The Mazur references are generally directed to methods for making black silicon by subjecting the silicon to femtosecond laser pulses under high temperature annealing conditions to form cone-like structures on the exposed surface.

In contrast, the instant method produces a "passivation" layer in-situ as the etch process proceeds. As the silicon-containing base is contacted with $SF_6$ and $O_2$ gas at cryogenic temperatures during the ICP etch process, the SiOF byproduct forms an in-situ "mask" on the substrate, which is thought to be present first as a stubble on the surface. Continued etching of the substrate results in the needle-like structures of the textured substrate according to embodiments described herein. The result is not only a new and novel textured substrate, but in-addition, the instant method provides for a facile and inexpensive process capable of producing this new and novel textured substrate in great quantity using known equipment.

In an embodiment, the etching the silicon substrate is conducted under conditions sufficient to create a high density of black silicon across the surface of the substrate.

The temperature at which the process is conducted is critical to producing the textured substrate disclosed herein. Interestingly, the lower temperatures required by the instant disclosure are in contrast to common-knowledge in the art, which are directed to higher temperatures to produce vertical sidewalls in a substrate.

EMBODIMENTS

Accordingly, the instant disclosure relates to the following embodiments.

E1. A blackbody calibration target comprising:
a textured silicon substrate comprising a base comprising a plurality of needle like structures extending away from the base and having a total emissivity of greater than 99.5% from an electromagnetic radiation source having a wavelength greater than or equal to about 400 nanometers and less than or equal to about 1 mm.

E2. The blackbody calibration target according to embodiment E1, having a total emissivity of greater than 99.5% from an electromagnetic radiation source having a wavelength of greater than or equal to about 700 nm and less than or equal to about 1 millimeter.

E3. The blackbody calibration target according to embodiment E1 or E2, wherein the plurality of needle like structures extend away from the base to an average height from the base of greater than or equal to about 1 micrometer determined perpendicular to the base, and have an average width of less than or equal to about 1 micrometer determined at an average midpoint height of the structures parallel to the base.

E4. The blackbody calibration target according to any one of embodiments E1 through E3, wherein the needle like structures have an average height from the base of less than or equal to about 50 micrometers.

E5. The blackbody calibration target according to any one of embodiments E1 through E4, wherein the needle like structures are present on at least a portion of the base at a density of greater than or equal to about 40,000 needle like structures per square millimeter.

E6. The blackbody calibration target according to any one of embodiments E1 through E5, wherein the silicon substrate comprises monocrystalline silicon, polycrystalline silicon, amorphous silicon, or a combination thereof.

E7. The blackbody calibration target according to any one of embodiments E1 through E6, wherein the silicon substrate further comprises at least one additional element selected from Groups 13 to 16 of the periodic table, present in an amount sufficient to produce a resistivity in the silicon substrate of less than or equal to about 1 ohm-cm.

E8. The blackbody calibration target according to any one of embodiments E1 through E7, wherein the plurality of needle like structures extending away from the base are produced by contacting a surface of the silicon substrate with an inductively coupled plasma comprising $SF_6$ and $O_2$ gas, without a mask, at a forward power, a temperature, a pressure and for a period of time sufficient to etch the surface to produce the plurality of needle like structures extending away from the base.

E9. The blackbody calibration target according to embodiment E8, wherein the temperature is less than or equal to about −120° C.

E10. The blackbody calibration target according to any one of embodiments E1 through E10, comprising a plurality of the textured substrates fitted together.

E11. The blackbody calibration target according to embodiment E10, wherein a first textured substrate has different emissivity properties than a second textured substrate.

E12. A blackbody calibration system comprising a blackbody calibration target according to any one of embodiments E1 through E11 in thermal communication with a controlled temperature source.

E13. A blackbody calibration system comprising a blackbody calibration target in thermal communication with a controlled temperature source, the blackbody calibration target comprising a textured silicon substrate comprising a base comprising a plurality of needle like structures extending away from the base and having a total emissivity of greater than 99.5% from an electromagnetic radiation source having a wavelength greater than or equal to about 400 nanometers an less than or equal to about 1 mm.

E14. The blackbody calibration system according to embodiments E12 or E13, wherein the plurality of needle like structures extend away from the base to an average height from the base of greater than or equal to about 1 micrometer and less than or equal to about 50 micrometers, determined perpendicular to the base, and have an average width of less than or equal to about 1 micrometer determined at an average midpoint height of the structures parallel to the base.

E15. The blackbody calibration system according to any one of embodiments E12 through E14, wherein the needle like structures are present on at least a portion of the base at a density of greater than or equal to about 40,000 needle like structures per square millimeter.

E16. The blackbody calibration system according to any one of embodiments E12 through E15, wherein the silicon substrate further comprises at least one additional element selected from Groups 13 to 16 of the periodic table present in an amount sufficient to produce a resistivity in the silicon substrate of less than or equal to about 1 ohm-cm.

E17. The blackbody calibration system according to any one of embodiments E12 through E16, wherein the plurality of needle like structures extending away from the base are produced by contacting a surface of the silicon substrate with an inductively coupled plasma comprising $SF_6$ and $O_2$ gas, without a mask, at a forward power, a temperature, a pressure and for a period of time sufficient to etch the surface to produce the plurality of needle like structures extending away from the base, wherein the temperature is less than or equal to about −120° C.

E18. A method of calibrating an optical instrument comprising:
providing a blackbody calibration system according to any one of embodiments E12 through E17;
controlling the temperature of the calibration target at a first temperature; and
optically measuring the temperature of the calibration target with the instrument to calibrate the instrument.

E19. A method of calibrating an optical instrument comprising:
  providing a blackbody calibration system comprising a calibration target in thermal communication with at controlled temperature source, the calibration target comprising a textured substrate comprising a silicon base having an emissivity of greater than 99.5% from electromagnetic radiation having a wavelength greater than or equal to about 400 nanometers and less than or equal to about 20 microns, or 1 mm;
  controlling the temperature of the calibration target at a first temperature; and optically measuring the temperature of the calibration target with the instrument to calibrate the instrument.

E20. An instrument comprising:
  an electromagnetic radiation source in optical communication with a detector; and
  a blackbody calibration system according to any one of embodiments E12 through E17, which is arrangable in optical communication with the electromagnetic radiation source.

E21. An optical instrument comprising:
  an electromagnetic radiation source in optical communication with a detector along an optical path; and a blackbody calibration system arrangable within the optical path, wherein the blackbody calibration system comprises a blackbody calibration target in thermal communication with a controlled temperature source, the blackbody calibration target comprising a textured silicon substrate comprising a base comprising a plurality of needle like structures extending away from the base to an average height of greater than or equal to about 1 micrometer and less than or equal to about 50 micrometers, determined perpendicular to the base, and having an average width of less than or equal to about 1 micrometer determined at an average midpoint height of the structures parallel to the base, the blackbody calibration target having a total emissivity of greater than 99.5% at a wavelength greater than or equal to about 400 nanometers and less than or equal to about 20 microns, or 1 mm.

EXAMPLES

For purposes herein, the total emissivity was determined by measuring the hemispherical emissivity of a sample. The spectra were acquired in two wavelength ranges: 0.2-2.5 µm and 2-15.4 µm using hemispherical reflectance measured with a modified Beckman UV5240 Spectrophotometer. The measurements were acquired using a single pass monochromator/diffraction grating arrangement with a sampling interval of about 0.001 µm from 0.2-0.8 µm and 0.004 µm from 0.8-2.5 µm. The instrument was modified with an integrating sphere rotated 90%, which facilitates the measurement by allowing the sample holder to remain in a horizontal position.

In typical measurements, the sample was placed in the sample compartment where it and a Halon reference standard were illuminated alternately by monochromatic radiation from a high-intensity halogen lamp source.

Total emissivity spectra were acquired from 2.5-15 µm with a Nicolet 520FT-IR spectrometer equipped with a Labsphere integrating sphere. 1000 scans at 4 cm$^{-1}$ spectral resolution were acquired over ~15 min/sample and averaged together. The Nicolet FT-IR utilizes an internal HeNe laser to monitor the position of the moving mirror within each scan. Since the wavelength of the laser is accurately known, this laser also provides an internal wavelength calibration standard. A background spectrum was acquired using a diffuse gold plate and used to remove background radiation from the sample spectrum. Surface radiance is converted to emissivity using the temperature emissivity separation (TES) (Gillespie et al., 1998). Typically, for comparison of surface emissivity to laboratory data, Kirchhoffs Law (R=1−ε) (Nicodemus, 1965) is used to convert to emissivity from hemispherical reflectance.

Exemplary textured substrates were produced according to the instant disclosure to further evaluate emissivity properties of the textured substrate. The samples were produced using an Oxford PlasmaPro System 100. The etch was conducted in a single step. Typical parameters include:

| | continuous etch/passivation parameters |
|---|---|
| $SF_6$ | 85 sccm |
| $O_2$ | 21 sccm |
| ICP power | 900 W |
| Forward power | 5 W |
| chamber pressure | 8 mTorr |
| temperature | −138° C. to −140° C. |
| etch time | ~30 min |

A series of samples were prepared using different substrates and etched at various temperatures as indicated in Table 1

TABLE 1

| Sample | Si substrate resistivity (Ohm-cm) | Etch Temp (degrees C.) | total etch time (min.) |
|---|---|---|---|
| Sample 1 | 0.005 | −140 | 30 |
| Sample 2 | 7.1 e10$^{-4}$ p-type | −140 | 30 |
| Sample 3 | 7.1 e10$^{-4}$ p-type | −138 | 30 |
| Sample 4 | 7.1 e10$^{-4}$ p-type | −135 | 30 |
| Sample 5 | 0.02 n-type | −138 | 30 |

Figure 2:
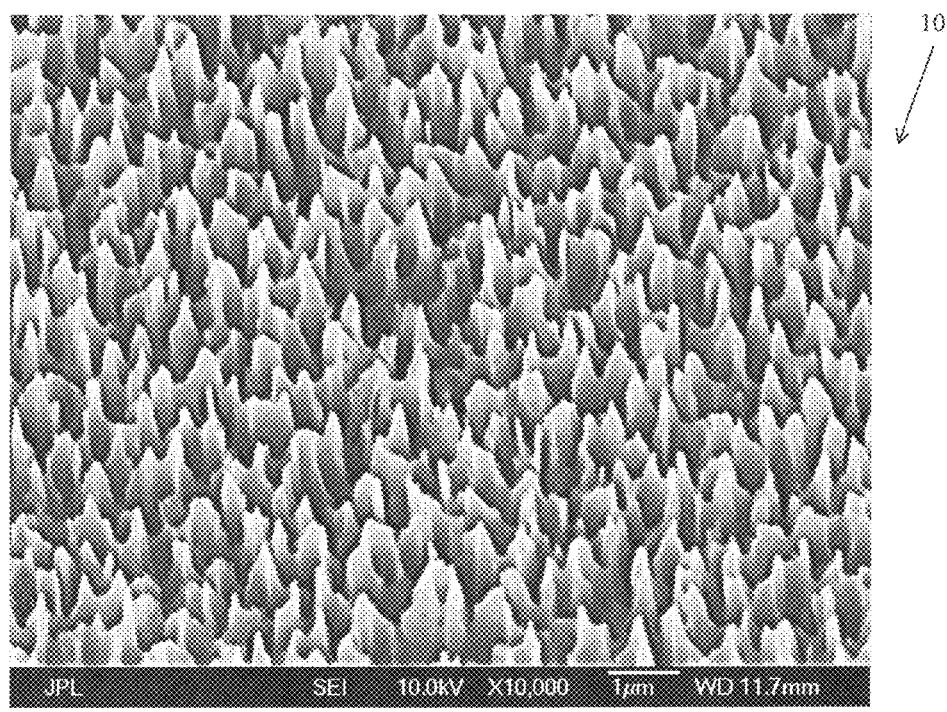
FIG. 2 is an electron micrograph showing an overhead view of a textured substrate according to embodiments of the instant disclosure.

The electron micrograph of Sample 1 is shown in FIGS. 1 and 2. As the figure shows, the textured silicon substrate (10) produced according to the instant disclosure comprises a plurality of needle-like structures (12) depend perpendicularly away from the base (14). The needle like structures 12 have an average height 16 from the base of 5 to 6 micrometers determined perpendicular to base 14, and an average width (18) from about 0.5 to 1 micrometer.

As shown in FIG. 2, the needle like structures are present on the textured substrate at a density from about 1,000,000 per mm$^2$ to about 7,000,000 per mm$^2$.

Figure 3:
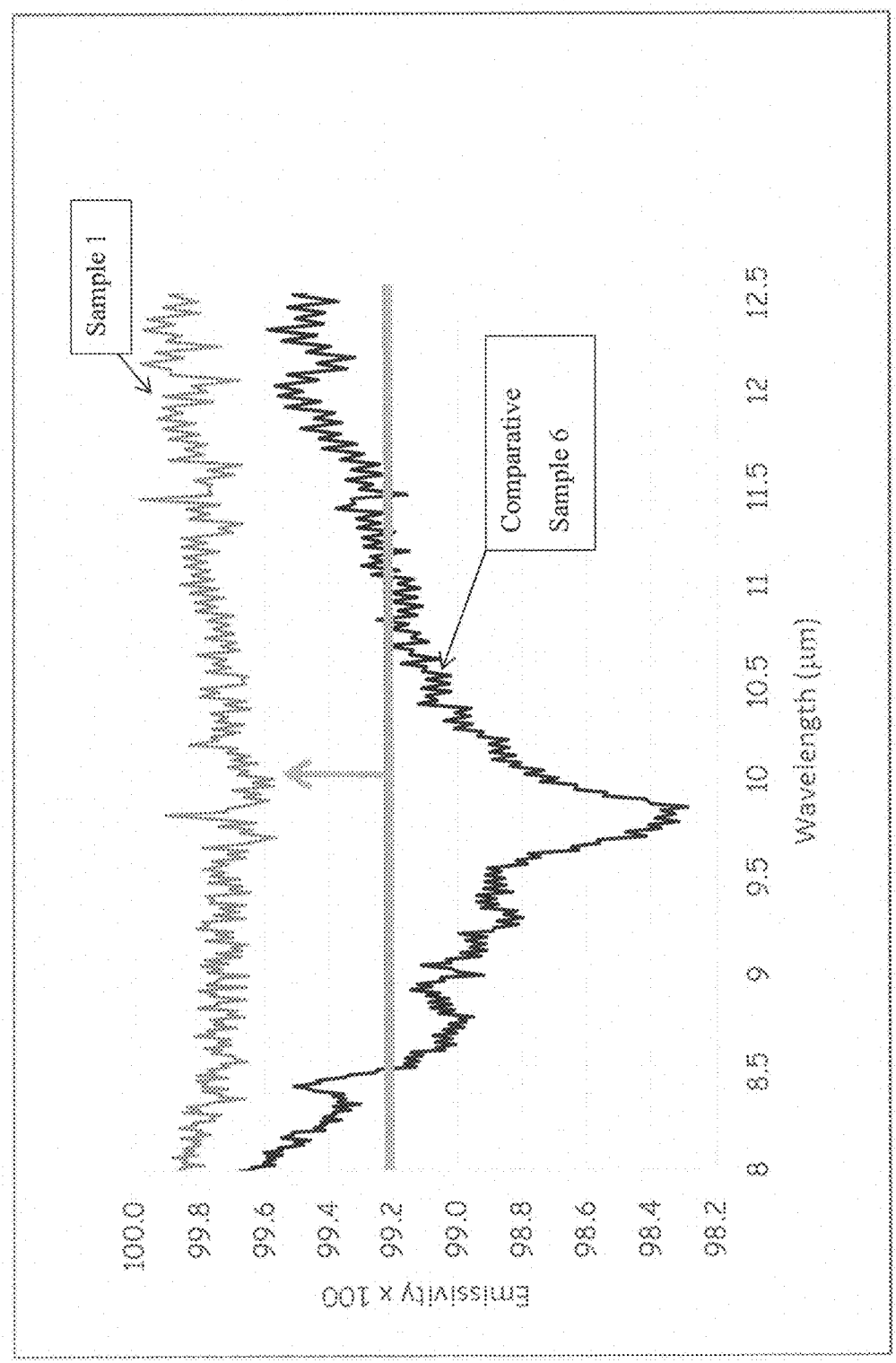
FIG. 3 is a graph showing the emissivity of a blackbody calibration target according to embodiments of the instant disclosure compared to a comparative commercially available blackbody calibration target.

FIG. 3 shows a graph of the emissivity of sample 1 relative to a commercially available blackbody calibration target, comparative sample 6, which is a modified model SR-800N Superior Accuracy Blackbody (CI SYSTEMS, Simi Valley, Calif.).

Figure 4:
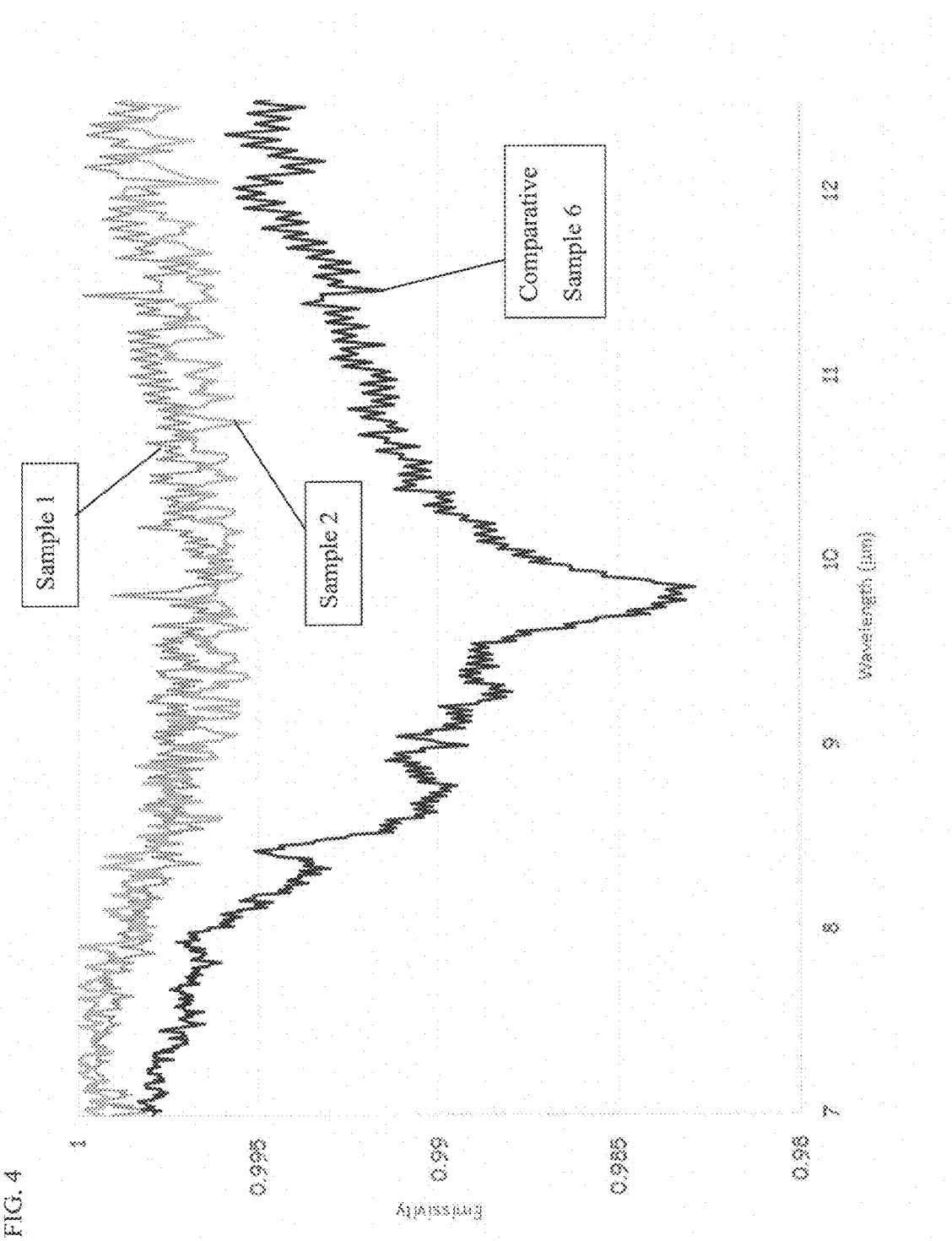
FIG. 4 is a graph showing the emissivity of a blackbody calibration target according to embodiments of the instant disclosure compared to a comparative commercially available blackbody calibration target.

FIG. 4 shows a graph of the emissivity of a duplicate sample 1 and sample 2 relative to the commercially available blackbody calibration target, comparative sample 6.

Figure 5:
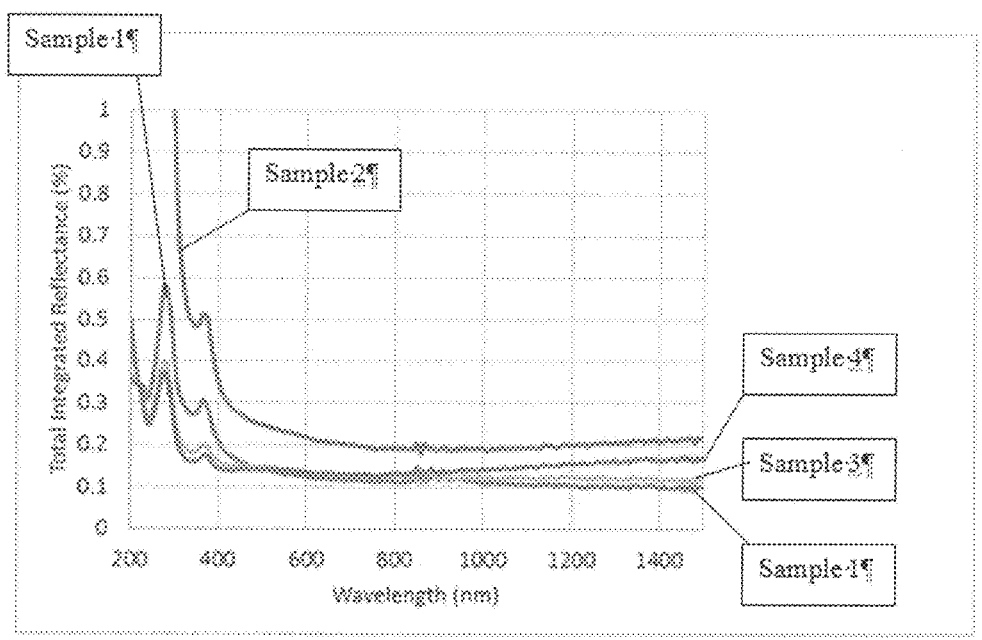
FIG. 5 is a graph showing the total integrated reflectance of blackbody calibration targets produced from substrates under various conditions according to embodiments of the instant disclosure.
Figure 6:
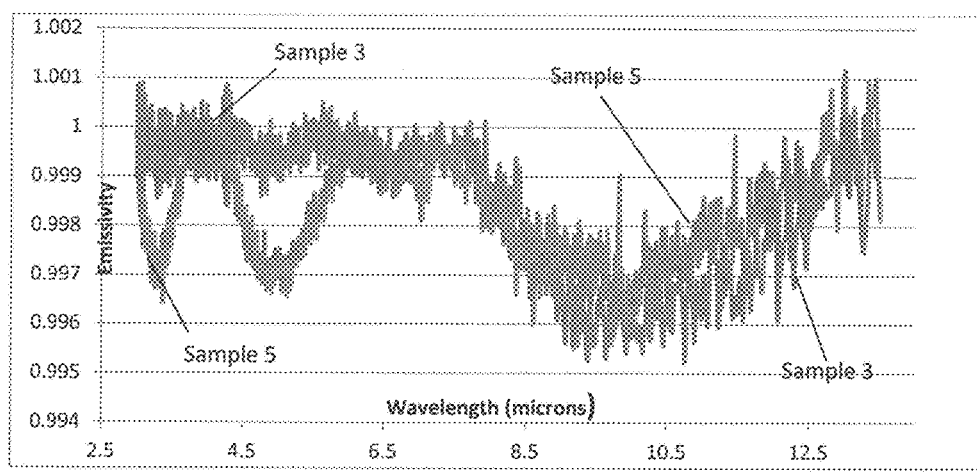
FIG. 6 is a graph showing the emissivity of a blackbody calibration target according to embodiments of the instant disclosure having relatively high conductivity substrates.

FIG. 5. shows the total integrated reflectance (%) for samples 1 through 4. The total emissivity is equal to the total integrated reflectance subtracted from 100%. FIG. 6 shows a graph of the emissivity of a duplicate of sample 3 and the more conductive sample 5, having a resistivity of 0.02 ohm-cm. As these data show, more highly doped silicon substrates, i.e., having lower resistivity, have improved emissivity at various wavelengths.

All patents and publications mentioned in the specification are indicative of the level of those skilled in the art to which the invention pertains. All patents and publications are herein incorporated by reference to the same extent as if each individual publication was specifically and individually indicated to be incorporated by reference.

It should be understood, of course, that the foregoing relates to preferred embodiments of the invention and that modifications may be made without departing from the spirit and scope of the invention as set forth in the following claims.

We claim:

1. A blackbody calibration target comprising:
a textured silicon substrate comprising a base comprising a plurality of needle like structures extending away from the base, wherein the textured silicon substrate has a total emissivity of greater than 99.5% from an electromagnetic radiation source having a wavelength greater than or equal to 400 nanometers and less than or equal to 1 millimeter.

2. The blackbody calibration target of claim 1, having a total emissivity of greater than 99.5% from an electromagnetic radiation source having a wavelength of greater than or equal to 700 nanometers and less than or equal to 20 micrometers.

3. The blackbody calibration target of claim 1, wherein the needle like structures are present on at least a portion of the base at a density of greater than or equal to 40,000 needle like structures per square millimeter.

4. The blackbody calibration target of claim 1, wherein the silicon substrate comprises monocrystalline silicon, polycrystalline silicon, amorphous silicon, or a combination thereof.

5. The blackbody calibration target of claim 1, wherein the silicon substrate further comprises at least one additional element selected from Groups 13 to 16 of the periodic table, present in an amount sufficient to produce a resistivity in the silicon substrate of less than or equal to 1 ohm-cm.

6. The blackbody calibration target of claim 1, wherein the plurality of needle like structures extend away from the base to an average height from the base of greater than or equal to 1 micrometer determined perpendicular to the base, and have an average width of less than or equal to 1 micrometer determined at an average midpoint height of the structures parallel to the base.

7. The blackbody calibration target of claim 6, wherein the needle like structures have an average height from the base of less than or equal to 50 micrometers.

8. The calibration target of claim 1, wherein the plurality of needle like structures extending away from the base are produced by contacting a surface of the silicon substrate with an inductively coupled plasma comprising $SF_6$ and $O_2$ gas, without a mask, at a forward power, a temperature, a pressure and for a period of time sufficient to etch the surface to produce the plurality of needle like structures extending away from the base.

9. The blackbody calibration target of claim 8, wherein the temperature is less than or equal to −120° C.

10. The calibration target of claim 1, comprising a plurality of the textured substrates fitted together.

11. The calibration target of claim 10, wherein a first textured substrate has different emissivity properties than a second textured substrate.

12. A blackbody calibration system comprising a blackbody calibration target in thermal communication with a controlled temperature source, the blackbody calibration target comprising a textured silicon substrate comprising a base comprising a plurality of needle like structures extending away from the base, wherein the textured silicon substrate has a total emissivity of greater than 99.5% from an electromagnetic radiation source having a wavelength greater than or equal to 400 nanometers and less than or equal to 1 millimeter.

13. The blackbody calibration system of claim 12, wherein the plurality of needle like structures extend away from the base to an average height from the base of greater than or equal to 1 micrometer and less than or equal to 50 micrometers, determined perpendicular to the base, and have an average width of less than or equal to 1 micrometer determined at an average midpoint height of the structures parallel to the base.

14. The blackbody calibration system of claim 12, wherein the needle like structures are present on at least a portion of the base at a density of greater than or equal to 40,000 needle like structures per square millimeter.

15. The blackbody calibration system of claim 12, wherein the silicon substrate further comprises at least one additional element selected from Groups 13 to 16 of the periodic table present in an amount sufficient to produce a resistivity in the silicon substrate of less than or equal to 1 ohm-cm.

16. The blackbody calibration system of claim 12, wherein the plurality of needle like structures extending away from the base are produced by contacting a surface of the silicon substrate with an inductively coupled plasma comprising $SF_6$ and $O_2$ gas, without a mask, at a forward power, a temperature, a pressure and for a period of time sufficient to etch the surface to produce the plurality of needle like structures extending away from the base, wherein the temperature is less than or equal to −120° C.

17. An instrument comprising:
an electromagnetic radiation source in optical communication with a detector along an optical path; and a blackbody calibration system arrangable within the optical path, wherein the blackbody calibration system comprises a blackbody calibration target in thermal communication with a controlled temperature source, the blackbody calibration target comprising a textured silicon substrate comprising a base comprising a plurality of needle like structures extending away from the base to an average height of greater than or equal to about 1 micrometer and less than or equal to 50 micrometers, determined perpendicular to the base, and having an average width of less than or equal to about 1 micrometer determined at an average midpoint height of the structures parallel to the base, the blackbody calibration target having a total emissivity of greater than 99.5% at a wavelength greater than or equal to 400 nanometers an less than or equal to about 1 millimeter.

* * * * *